United States Patent
Azami et al.

[11] Patent Number: 5,568,322
[45] Date of Patent: Oct. 22, 1996

[54] IMAGE FORMING LENS SYSTEM

[75] Inventors: Kae Azami; Hiroyuki Hirano, both of Tokyo, Japan

[73] Assignee: Asahi Kogaku Kogyo Kabushiki Kaisha, Tokyo, Japan

[21] Appl. No.: 204,615

[22] Filed: Mar. 1, 1994

[30] Foreign Application Priority Data

Mar. 2, 1993 [JP] Japan .................................. 5-041376

[51] Int. Cl.$^6$ ...................................... G02B 9/20
[52] U.S. Cl. .......................... 359/689; 359/784; 359/785; 359/690
[58] Field of Search .................... 359/784, 785, 359/689, 690, 695, 716, 788, 790

[56] References Cited

U.S. PATENT DOCUMENTS

| | | | |
|---|---|---|---|
| 568,052 | 9/1896 | Taylor | 359/785 |
| 1,937,168 | 11/1933 | Repp | 359/785 |
| 2,538,077 | 1/1951 | Blosse | 359/784 |
| 2,962,930 | 12/1960 | Johnson | 359/785 |

FOREIGN PATENT DOCUMENTS

| | | | |
|---|---|---|---|
| 56-46206 | 4/1981 | Japan | 359/784 |
| 62-123418 | 11/1985 | Japan | 359/784 |

*Primary Examiner*—David C. Nelms
*Assistant Examiner*—Vu A. Le
*Attorney, Agent, or Firm*—Kane, Dalsimer, Sullivan, Kurucz, Levy, Eisele and Richard, LLP

[57] ABSTRACT

An image forming lens system is provided which has at least three lens groups, wherein diameters of outer most circumferences of all of the lens groups are identical, and wherein positions of at least two of the lens groups in an optical axis direction is determined by direct contact of the two lens groups.

17 Claims, 5 Drawing Sheets

IMAGE FORMING LENS SYSTEM

BACKGROUND OF THE INVENTION

1. Field of the Invention

The present invention relates to a small and lightweight image forming lens system which can be advantageously used with favorable results in a facsimile machine, an image scanner, or a compact camera, etc.

2. Description of Related Art

A conventional image forming lens system includes at least three lens groups, such as a triplet lens system which has three lens groups, each consisting of three lenses, or a Tessar lens system having three lens groups, each of which consists of four lenses.

FIG. 1 shows a known image forming lens system having a lens barrel 1 in which three lens groups L1, L2 and L3 are incorporated. The lens barrel 1 is provided on the inner peripheral surface thereof with a large diameter portion 1a and a small diameter portion 1b. The first lens group L1 is mounted to the large diameter portion 1a and abuts against the second lens group L2. The third lens group L3, an annular spacer 3, and the second lens group L2 are inserted in the small diameter portion 1b of the lens barrel 1 in this order from an object side (i.e., front) of the lens system. These elements abut against each other. The rearmost position of the third lens group L3 is restricted by a flange 1c which is integral with the lens barrel 1 at the rear end thereof. The frontmost position of the first lens group L1 is restricted by a lens holding ring 2 which is threadedly engaged with the lens barrel 1. The annular spacer 3 is provided with a fixed aperture stop (i.e., diaphragm) 3a integral therewith.

However, in the image forming lens system as mentioned above, the lens barrel 1 has a complex internal structure. Furthermore, the spacer ring 3, which also functions as an aperture stop, is complex and expensive.

SUMMARY OF THE INVENTION

It is an object of the present invention to provide a simple image forming lens system having at least three lens groups, wherein a lens barrel in which the lens system is provided is simplified, and further wherein a complex spacer ring is unnecessary.

To achieve the object mentioned above, according to the present invention, an image forming lens system is provided which has at least three lens groups, wherein diameters of outermost circumferences of all of the lens groups are identical, and wherein positions of at least two of the lens groups in an optical axis direction is determined by direct contact of the two lens groups.

A lens barrel is also provided for supporting the lens groups. The lens barrel includes a cylindrical portion having a constant inner peripheral surface diameter that corresponds to the diameter of the outermost circumference of the lens groups and an inner flange portion which is formed at one end of the cylindrical portion to restrict a rearmost position of the lens groups in the optical axis direction.

Preferably, the flange portion is provided at the rear end of the lens barrel and has an inner end edge that serves as a rear aperture stop, the inner end edge being located behind the lens groups.

According to another aspect of the present invention, all of the lens groups are in direct contact with each other and an annular light intercepting coating is provided on a peripheral portion of a lens face Of the lens groups, the light intercepting annular coating functioning as an aperture stop having a fixed inner diameter.

According to yet another aspect of the present invention, at least two lens groups are in contact with each other through an intermediate annular sheet, the intermediate annular sheet functioning as an aperture stop having a fixed inner diameter.

In an embodiment, the first lens group has a positive meniscus lens with a convex lens surface on the object side; the second lens group consists of a double-concave lens; and, the third lens group consists of a double-convex lens. The first, second and third lens groups are arranged in this order from the object side.

The third lens group can be a cemented lens having a negative lens adhered to a positive lens.

Preferably, the lens groups satisfy the following relationships;

$$0.8 < f_1/f \leq 1.0 \tag{1}$$

$$0.2 < -f_2/f < 0.4 \tag{2}$$

$$0.2 < f_3/f < 0.4 \tag{3}$$

$$0.6 < -r_{1\text{-}2}/r_{2\text{-}1} < 0.8 \tag{4}$$

$$0.5 < r_{2\text{-}2}/r_{3\text{-}1} < 0.7 \tag{5}$$

$$d_{1\text{-}2}/L < 0.15 \tag{6}$$

$$d_{2\text{-}3}/L < 0.1 \tag{7}$$

wherein, f=focal length of the whole lens system;

$f_i$=focal length of the i-th lens group;

$r_{i\text{-}1}$=radius of curvature of the lens surface of the i-th lens group from the object side;

$r_{i\text{-}2}$=radius of curvature of the lens surface of the i-th lens group from the image side;

L=length of the whole lens system;

$d_{i\text{-}j}$=spatial distance between the i-th lens group and the j-th lens group.

$f_i$=focal length of the i-th lens group;

$r_{i\text{-}1}$=radius of curvature of the lens surface of the i-th lens group from the object side;

$r_{i\text{-}2}$=radius of curvature of the lens surface of the i-th lens group from the image side;

L=length of the whole lens system;

$d_{i\text{-}j}$=spatial distance between the i-th lens group and the j-th lens group.

The first, second and third lens groups are preferably all made of optical glass lenses.

The present disclosure relates to subject matter contained in Japanese patent application No.5-41376 (filed on Mar. 2, 1993) which is expressly incorporated herein by reference in its entirety.

BRIEF DESCRIPTION OF THE DRAWINGS

The invention will be described below in detail with reference to the accompanying drawings, in which.

DESCRIPTION OF THE PREFERRED EMBODIMENT

Figure 1:
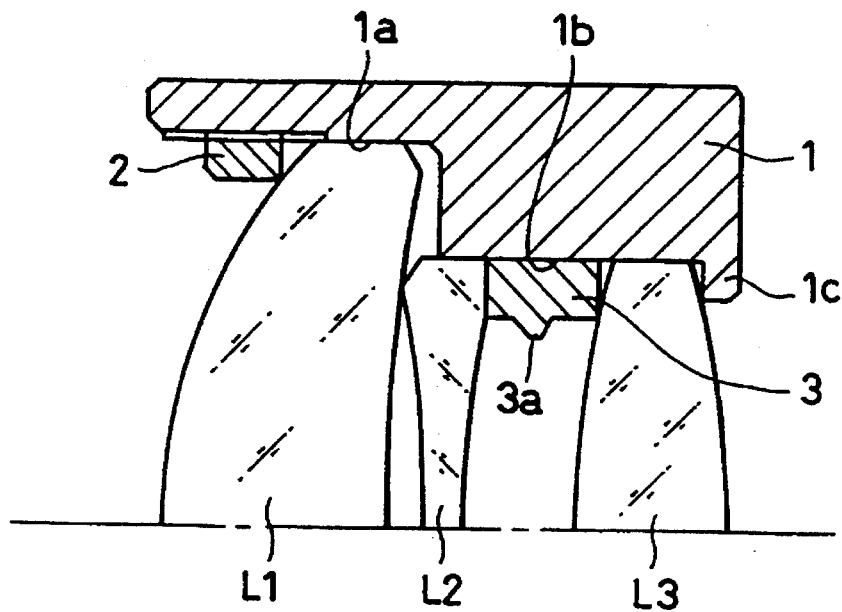
FIG. 1 is a sectional view of an upper half of a known triplet lens system incorporated in a lens barrel.
Figure 2:
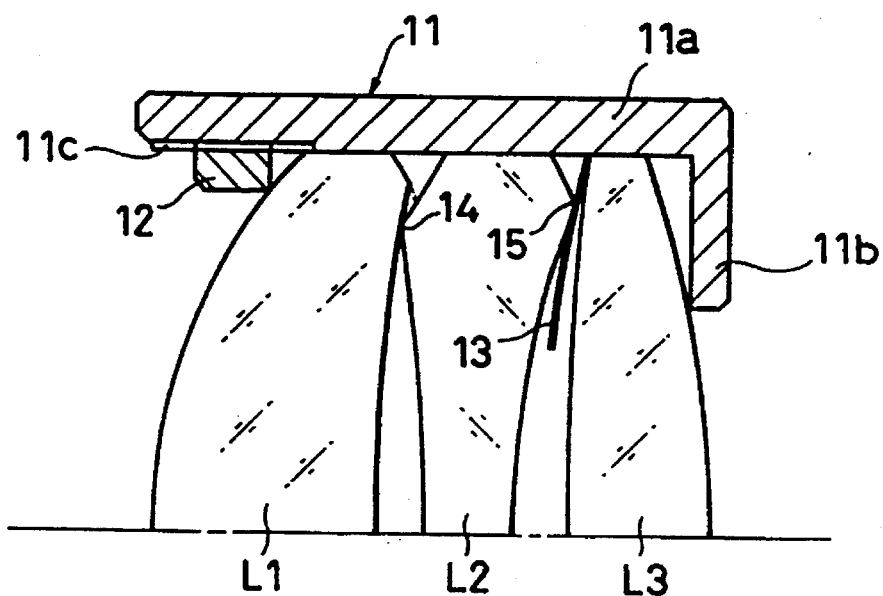
FIG. 2 is a sectional view of an upper half of an image forming lens system including a lens barrel, according to an embodiment of the present invention.

A lens barrel 11 is provided with a cylindrical portion 11a having a constant inner peripheral surface diameter, and an inner flange 11b which extends radially inward from the rear end of the cylindrical portion 11a. The cylindrical portion 11a is provided, on the inner peripheral surface of the front end thereof, with a female threaded portion 11c. The image forming lens system supported by the lens barrel 11 is comprised of a first lens group L1 made of a positive meniscus lens with a convex lens surface on the object side, a second lens group L2 consisting of a double-convex lens, an annular sheet aperture stop 13, and a third lens group L3 consisting of a double-convex lens. These elements are located in this order from the object side.

The diameter of the outermost circumference of each lens group is identical to the inner peripheral surface diameter of the cylindrical portion 11a of the lens barrel 11. The first lens group L1 is directly in contact with the second lens group L2. The second lens group L2 is opposed to the third lens group L3 with the sheet aperture stop 13 held therebetween. The image side of the third lens group L3 abuts against the flange 11b of the lens barrel 11. The first lens group L1 is immovably held at the lens surface thereof on the object side by the lens holding ring 12 which is threadedly engaged with the female threaded end 11c of the lens barrel 11. The sheet aperture stop 13 is made of a plastic material, for example polyester, preferably having a thickness of 10 μm–20 μm.

In the illustrated embodiment, the intermediate lens group, i.e., the second lens group L2 is provided with abutting portions 14 and 15 against which the first lens group L1 and the third lens group L3 (through the sheet aperture stop 13) abut, respectively. The distance between the first and second lens groups L1 and L2, and the distance between the second lens group L2 and the third lens group L3 are determined in accordance with the radius of curvature of the lens surface of the first lens group L1 on the image side, the radius of curvature of the lens surface of the third lens group L3 on the object side, the distances of the abutting portions 14 and 15 from the optical axis, and the thickness of the sheet aperture stop 13, etc.

In the arrangement of the lens groups that are combined as mentioned above, not only can the structure and shape of the lens barrel 11 be simplified, but also, a spacer ring which would otherwise be necessary to define the distance between the lens groups, can be dispensed with. Accordingly, the manufacturing cost of the image forming lens system can be reduced.

It is possible to calk the front end of the lens barrel 11 in order to secure the first lens group L1 instead of using the lens holding ring 12.

Figure 3:
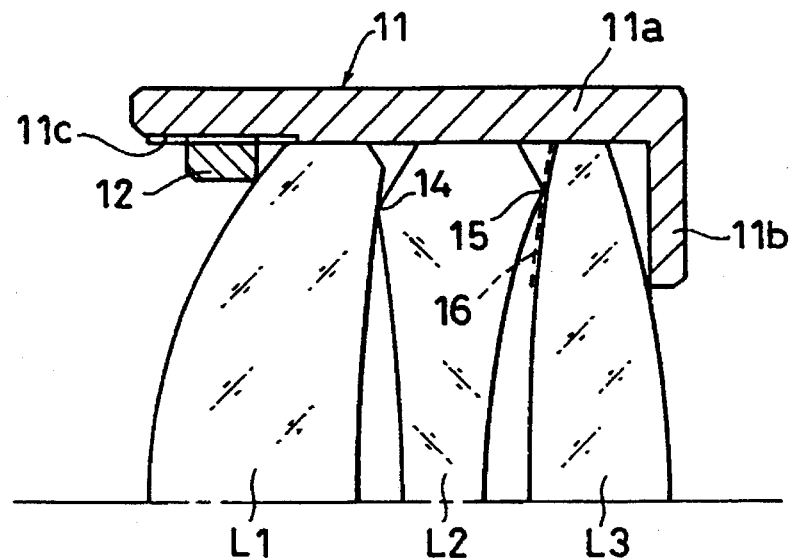
FIG. 3 is a sectional view of an upper half of an image forming lens system, according to another embodiment of the present invention.
Figure 4:
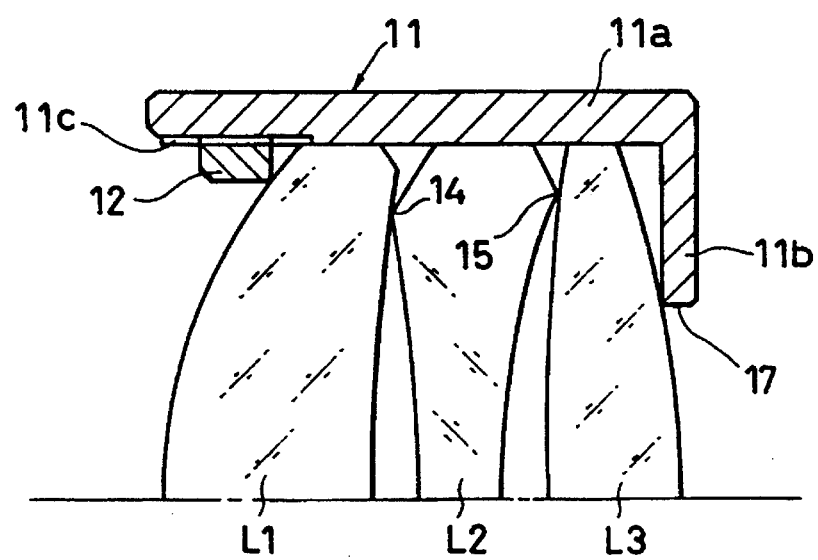
FIG. 4 is a sectional view of an upper half of an image forming lens system, according to still another embodiment of the present invention.

FIG. 3 shows another embodiment of the present invention in which a peripheral portion of a lens face of the third lens group L3 is coated with a light intercepting layer 16 which functions as an aperture stop, in place of the sheet aperture stop 13. FIG. 4 shows still another embodiment of the present invention in which the rear end flange 11b of the lens barrel 11 is provided with an inner end edge 17 which functions as a fixed rear aperture stop, in place of the sheet aperture stop 13 or the coating 16. In the modified embodiments illustrated in FIGS. 3 and 4, the number of the elements can be reduced.

Examples of numerical data of the lens groups in combination are discussed below.

EXAMPLE 1

Figure 5:
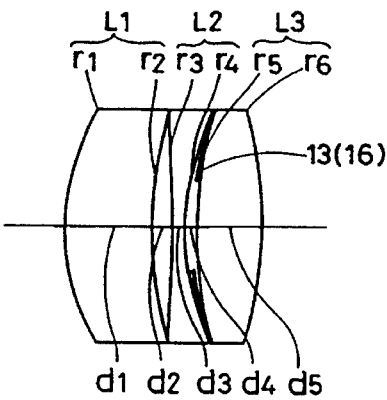
FIG. 5 is a schematic sectional view of a first embodiment of a lens arrangement according to the present invention.
Figures 6A, 6B, 6C, 6D, 6E:
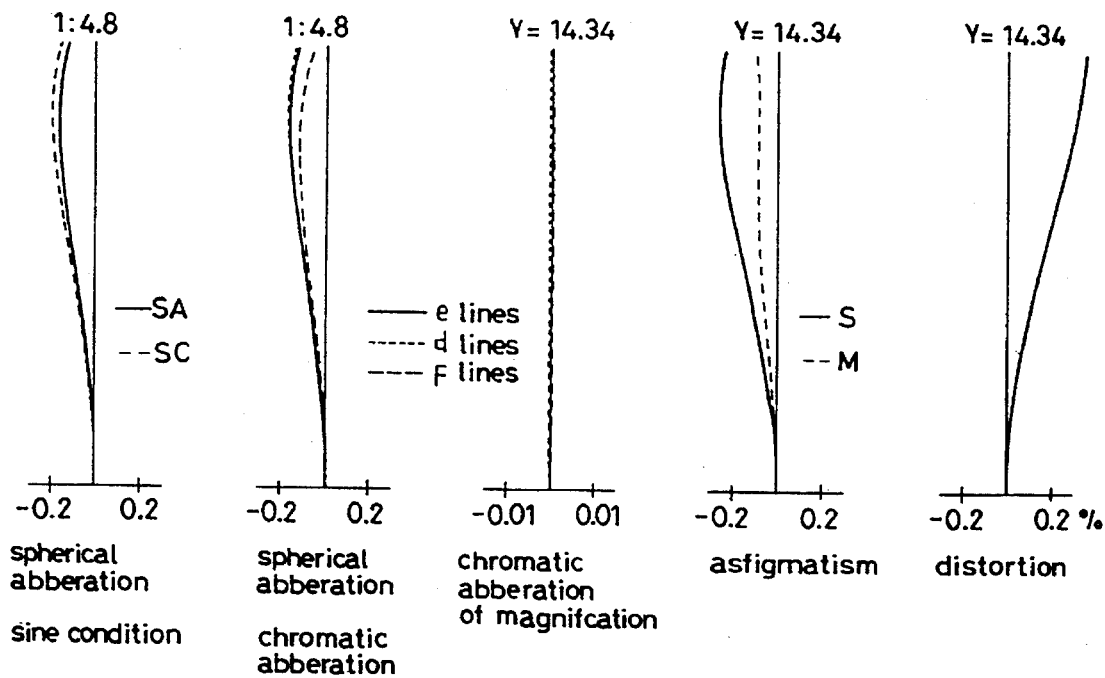
FIGS. 6A, 6B, 6C, 6D and 6E show diagrams of various aberrations in the lens arrangement shown in FIG. 5 when magnification is −0.112.

FIG. 5 shows a first embodiment of the lens arrangement. Numerical data and various aberrations of the lens system are shown in Table 1 below and FIG. 6, respectively. In FIG. 6, "SA" designates a spherical aberration, "SC" a sine condition, "S" a sagittal ray, and "M" a meridional ray, respectively. Also, "e-lines", "e-lines" and "F-lines" designate the chromatic aberration and the chromatic aberration of magnification represented by the spherical aberration, at the respective wavelengths.

In Tables 1, 2 and 3 and FIGS. 5, 6 and 7–10, "$F_{NO}$" designates the F number, "f" the focal length, "M" the lateral magnification, "Y" the image height, "ω" the half angle of view, "$f_B$" flange back, "$r_i$" the radius of curvature of each lens surface, "$d_i$" the lens thickness or the lens distance, "$N_e$" the refractive index of the e-lines, and "ν" the Abbe number of the d-lines, respectively.

TABLE 1

| $F_{NO}$ = 1:4.8; f = 30.50; M = −0.112; Y = 14.34 | | | | |
|---|---|---|---|---|
| Surface No. | r | d | $N_e$ | ν |
| 1 | 8.873 | 3.60 | 1.71615 | 53.9 |
| 2 | 13.570 | 0.84 | — | — |
| 3 | −19.975 | 0.51 | 1.72311 | 29.5 |
| 4 | 9.800 | 0.47 | — | — |
| 5 | 16.042 | 2.60 | 1.81077 | 40.9 |
| 6 | −16.042 | — | — | — |

EXAMPLE 2

Figure 7:
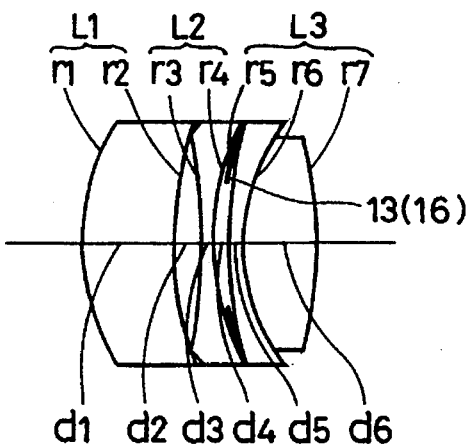
FIG. 7 is a schematic sectional view of a second embodiment of a lens arrangement according to the present invention.
Figures 8A, 8B, 8C, 8D:
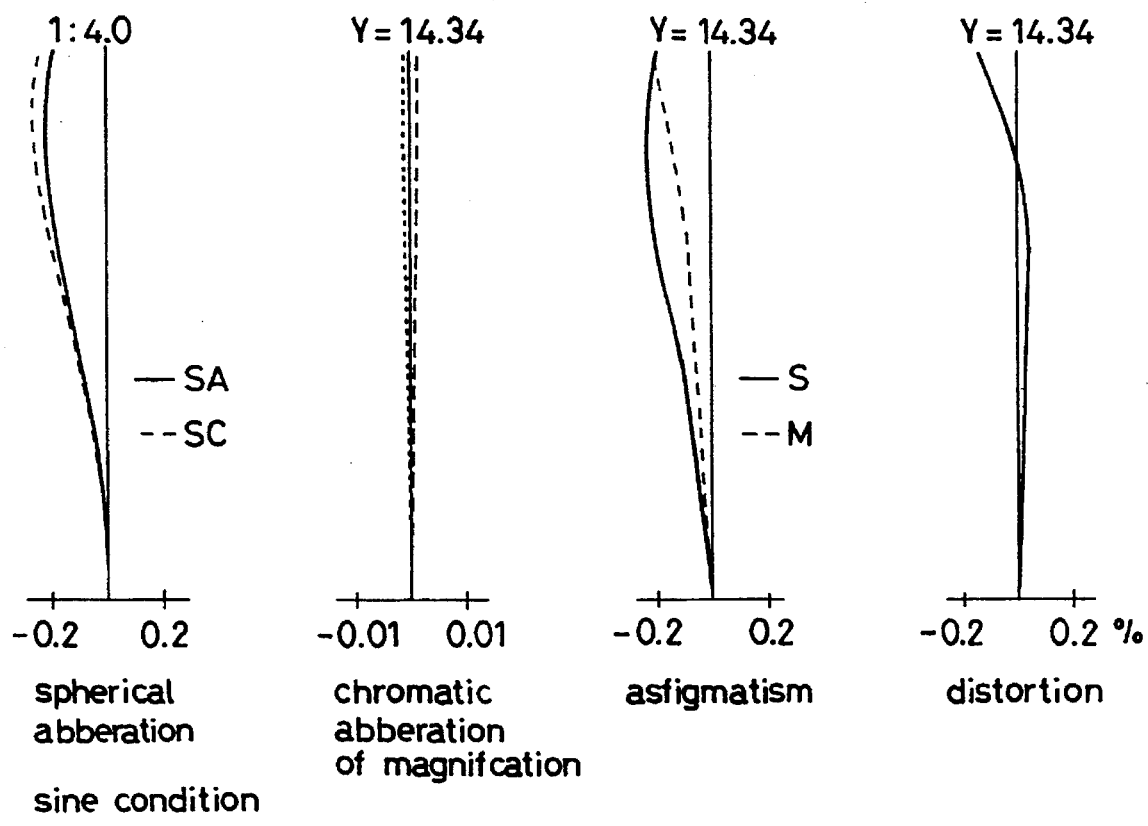
FIGS. 8A, 8B, 8C and 8D show diagrams of various aberrations in the lens arrangement shown in FIG. 7 when magnification is −0.112.

FIG. 7 shows a second embodiment of the lens arrangement. Numerical data and various aberrations of the lens system are shown in Table 2 below and FIG. 8, respectively. The second example is applied to a Tessar lens system in which the third lens group L3 is a cemented lens comprised of a negative lens adhered to a positive lens. Generally speaking, two lenses which are adhered to each other to construct a cemented lens have different diameters. The present invention can also be applied to such a cemented lens, provided that the diameter of the larger diameter lens is identical to the diameter of the remaining lens group or lens groups.

TABLE 2

$F_{NO} = 1:4.0$; f = 30.60; M = −0.112; Y = 14.34

| Surface No. | r | d | $N_e$ | ν |
|---|---|---|---|---|
| 1 | 9.977 | 4.00 | 1.77621 | 49.6 |
| 2 | 15.822 | 1.12 | — | — |
| 3 | −25.521 | 0.50 | 1.70443 | 30.1 |
| 4 | 10.210 | 0.66 | — | — |
| 5 | 18.122 | 0.62 | 1.79191 | 25.7 |
| 6 | 8.503 | 3.10 | 1.80642 | 35.0 |
| 7 | −19.043 | — | — | — |

EXAMPLE 3

Figure 9:
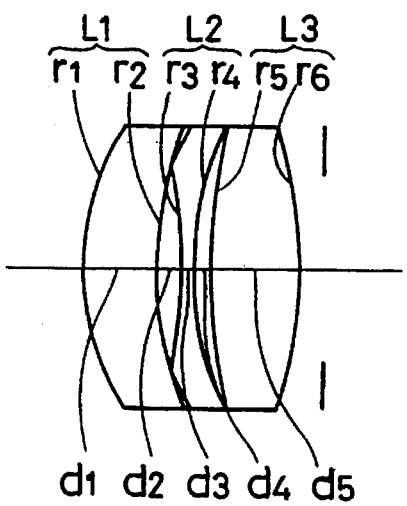
FIG. 9 is a schematic sectional view of a third embodiment of a lens arrangement according to the present invention; and, FIGS. 10A, 10B, 10C and 10D show diagrams of various aberrations in the lens arrangement shown in FIG. 9 when an object is located at infinity.
Figures 10A, 10B, 10C, 10D:
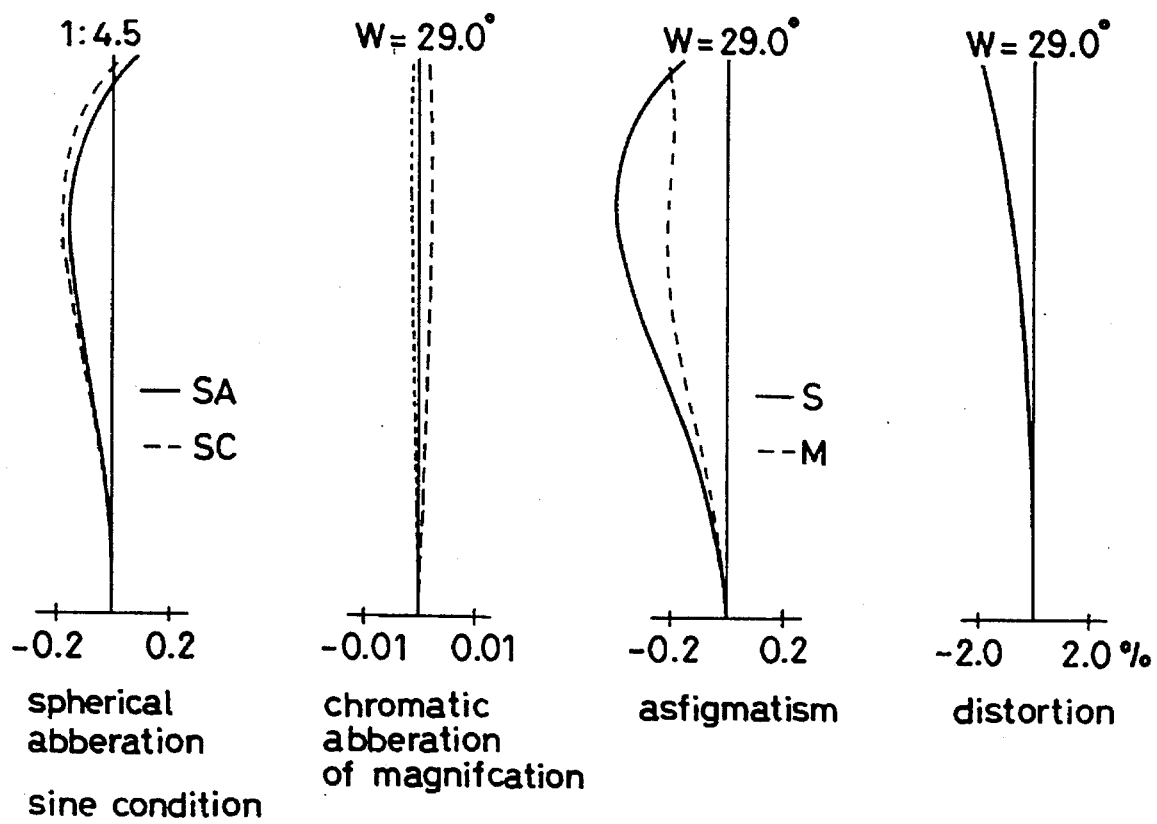

FIG. 9 shows a third embodiment of the lens arrangement. Numerical data and various aberrations of the lens system are shown in Table 3 below and FIG. 10, respectively. The third example is applied to a rear aperture stop type of lens system in which the aperture stop is located outside of the lens groups. This type of lens system corresponds to the arrangement shown in FIG. 4 in which the edge 17 of the end flange 11b of the lens barrel 11 serves as an aperture stop.

TABLE 3

$F_{NO} = 1:4.5$; f = 39.69; $f_B$ = 34.83; ω = 29.0

| Surface No. | r | d | $N_e$ | ν |
|---|---|---|---|---|
| 1 | 10.766 | 3.13 | 1.72794 | 38.0 |
| 2 | 16.404 | 0.97 | — | — |
| 3 | −26.064 | 0.50 | 1.72311 | 29.5 |
| 4 | 13.247 | 0.70 | — | — |
| 5 | 24.673 | 3.74 | 1.80811 | 46.6 |
| 6 | −19.368 | 1.00 | — | — |

The following discussion will be commonly applied to all the examples mentioned above.

In the embodiments, the lenses are all made of an optical glass. As is well known, in general, the optical properties of a glass lens are less influenced by temperature and humidity than those of a plastic lens.

All of the lenses of the lens groups satisfy the following requirements, so that an optimum optical property of an image forming lens can be obtained.

$0.8 < f_1/f \leq 1.0$ (1)

$0.2 < -f_2/f < 0.4$ (2)

$0.2 < f_3/f < 0.4$ (3)

$0.6 < -r_{1-2}/r_{2-1} < 0.8$ (4)

$0.5 < r_{2-2}/r_{3-1} < 0.7$ (5)

$d_{1-2}/L < 0.15$ (6)

$d_{2-3}/L < 0.1$ (7)

wherein, f=focal length of the whole lens system;

$f_i$=focal length of the i-th lens group;

$r_{i-1}$=radius of curvature of the lens surface of the i-th lens group from the object side;

$r_{i-2}$=radius of curvature of the lens surface of the i-th lens group from the image side;

L=length of the whole lens system;

$d_{i-j}$=spatial distance between the i-th lens group and the j-th lens group.

The above-mentioned requirements (1) through (3) define the power distribution of the lens groups. If the lens groups do not satisfy these requirements, it is difficult to correctly compensate the aberrations.

The requirement (4) defines the ratio of the radii of curvature of the opposed lens surfaces of the first and second lens groups L1 and L2. If this requirement is not met, it is difficult to correct the spherical aberration, coma, and curvature of field, in a balanced state.

The requirement (5) defines the ratio of the radii of curvature of the opposed surfaces of the second and third lens groups L2 and L3. If this requirement is not met, it is difficult to correct the spherical aberration and coma, in a balanced state. Moreover, if the value of $r_{2-2}/r_{3-1}$ is above the upper limit of 0.7 (i.e., if $r_{2-2}/r_{3-1} > 0.7$), the contact position of the second and third lens groups L2 and L3 will be too far from the optical axis. Accordingly, the diameter of the lenses must be increased, which is undesirable. A large lens diameter not only leads to an increase in the manufacturing cost of the lens system, but also results in a reduction in thickness of the third lens L3 consisting of double-convex lens surfaces, particularly at the peripheral edge thereof.

The requirements (6) and (7) define the distances between the lens groups. If the values of ($d_{1-2}/L$) and ($d_{2-3}/L$) are above the respective upper limits of 0.15 and 0.1, respectively, the contact position of the first and second lens groups, and the contact position of the second and third lens groups are too far from the optical axis. Accordingly, the diameter of the lenses must be increased, which is undesirable.

Numerical values of the above mentioned requirements (1) through (7) for the respective examples are shown in Table 4 below.

TABLE 4

| Requirement | Example 1 | Example 2 | Example 3 |
|---|---|---|---|
| (1) $f_1/f$ | 0.89 | 0.88 | 0.88 |
| (2) $-f_2/f$ | 0.30 | 0.34 | 0.30 |
| (3) $f_3/f$ | 0.34 | 0.39 | 0.35 |
| (4) $-r_{1-2}/r_{2-1}$ | 0.68 | 0.62 | 0.63 |
| (5) $r_{2-2}/r_{3-1}$ | 0.61 | 0.56 | 0.54 |
| (6) $d_{1-2}/L$ | 0.10 | 0.11 | 0.11 |
| (7) $d_{2-3}/L$ | 0.06 | 0.07 | 0.08 |

It can be seen in Table 4 above that the examples 1 through 3 are satisfied with the requirements (1) through (7). Furthermore, the aberrations are substantially correctly compensated in the image forming lens system according to the present invention.

As can be understood from the foregoing, according to the present invention, the lens groups can be stably held by a simple lens barrel structure without using a complex annular spacer. Accordingly, an inexpensive image forming lens system can be realized. Furthermore, an image forming lens system having an optimum optical property for a facsimile, an image scanner, or a compact camera, etc., can be easily realized, provided that the lens system satisfies predetermined requirements.

We claim:

1. An image forming lens system having at least three lens groups, wherein diameters of outer most circumferences of all of the lens groups are identical, and wherein positions of at least two lens groups of said at least three lens groups in an optical axis direction is determined by direct contact of the two lens groups and further comprising a lens barrel for supporting the lens groups, the lens barrel being provided with a cylindrical portion having a constant inner peripheral surface diameter that corresponds to the diameter of the outermost circumference of the lens groups and an inner flange portion which is formed at one end of the cylindrical portion to restrict a rearmost position of the lens groups in the optical axis direction, said flange portion is provided at the rear end of the lens and has an inner end edge that serves as a rear aperture stop which is located behind the lens groups.

2. The image forming lens system of claim 1, comprising:
a first lens group having a positive meniscus lens with a convex lens surface on the object side, a second lens group consisting of a double-concave lens, and a third lens group consisting of a double-convex lens, arranged in this order from the object side.

3. The image forming lens system of claim 2, wherein said third lens group is a cemented lens having a negative lens adhered to a positive lens.

4. The image forming lens system of claim 2, wherein the lens groups satisfy the following relationships;

$0.8 < f_1/f \leq 1.0$ (1)

$0.2 < -f_2/f < 0.4$ (2)

$0.2 < f_3/f < 0.4$ (3)

$0.6 < -r_{1-2}/r_{2-1} < 0.8$ (4)

$0.5 < r_{2-2}/r_{3-1} < 0.7$ (5)

$d_{1-2}/L < 0.15$ (6)

$d_{2-3}/L < 0.1$ (7)

wherein,
f=focal length of the whole lens system;
$f_i$=focal length of the i-th lens group;
$r_{i-1}$=radius of curvature of the lens surface of the i-th lens group on the object side;
$r_{i-2}$=radius of curvature of the lens surface of the i-th lens group on the image side;
L=length of the whole lens system;
$d_{i-j}$=spatial distance between the i-th lens group and the j-th lens group.

5. The image forming lens system of claim 1, wherein the first, second and third lens groups are all made of optical glass lenses.

6. An image forming lens system having at least three lens groups, wherein diameters of outer most circumferences of all of the lens groups are identical, wherein positions of at least two lens groups of said at least three lens groups in an optical axis direction is determined by direct contact of the two lens groups, wherein all of the lens groups are in direct contact with each other, and wherein an annular light intercepting coating is provided on a peripheral portion of a lens face of said lens groups, said light intercepting annular coating functioning as an aperture stop having a fixed inner diameter.

7. The image forming lens system of claim 6, wherein the first, second and third lens groups are all made of optical glass lenses.

8. The image forming lens system of claim 6, comprising:
a first lens group having a positive meniscus lens with a convex lens surface on the object side, a second lens group consisting of a double-concave lens, and a third lens group consisting of a double-convex lens, arranged in this order from the object side.

9. The image forming lens system of claim 8, wherein said third lens group is a cemented lens having a negative lens adhered to a positive lens.

10. The image forming lens system of claim 8, wherein the lens groups satisfy the following relationships;

$0.8 < f_1/f \leq 1.0$ (1)

$0.2 < -f_2/f < 0.4$ (2)

$0.2 < f_3/f < 0.4$ (3)

$0.6 < -r_{1-2}/r_{2-1} < 0.8$ (4)

$0.5 < r_{2-2}/r_{3-1} < 0.7$ (5)

$d_{1-2}/L < 0.15$ (6)

$d_{2-3}/L < 0.1$ (7)

wherein,
f=focal length of the whole lens system;
$f_i$=focal length of the i-th lens group;
$r_{i-1}$=radius of curvature of the lens surface of the i-th lens group on the object side;
$r_{i-2}$=radius of curvature of the lens surface of the i-th lens group on the image side;
L=length of the whole lens system;
$d_{i-j}$=spatial distance between the i-th and the j-th lens group.

11. An image forming lens system having at least three lens groups, wherein diameters of outer most circumferences of all of the lens groups are identical, and wherein positions of at least two lens groups of said at least three lens groups in an optical axis direction is determined by direct contact of the two lens groups, wherein at least two lens groups are in contact with each other through an intermediate annular sheet, said intermediate annular sheet functioning as an aperture stop having a fixed inner diameter.

12. The image forming lens system of claim 11, wherein the first, second and third lens groups are all made of optical glass lenses.

13. The image forming lens system of claim 11, comprising:
a first lens group having a positive meniscus lens with a convex lens surface on the object side, a second lens group consisting of a double-concave lens, and a third lens group consisting of a double-convex lens, arranged in this order from the object side.

14. The image forming lens system of claim 13, wherein said third lens group is a cemented lens having a negative lens adhered to a positive lens.

15. The image forming lens system of claim 13, wherein the lens groups satisfy the following relationships;

$0.8 < f_1/f \leq 1.0$ (1)

$0.2 < -f_2/f < 0.4$ (2)

$0.2 < f_3/f < 0.4$ (3)

$0.6 < -r_{1-2}/r_{2-1} < 0.8$ (4)

$$0.5 < r_{2\text{-}2}/r_{3\text{-}1} < 0.7 \quad (5)$$

$$d_{1\text{-}2}/L < 0.15 \quad (6)$$

$$d_{2\text{-}3}/L < 0.1 \quad (7)$$

wherein, f=focal length of the whole lens system;

$f_i$=focal length of the i-th lens group;

$r_{i\text{-}1}$=radius of curvature of the lens surface of the i-th lens group on the object side;

$r_{i\text{-}2}$=radius of curvature of the lens surface of the i-th lens group on the image side;

L=length of the whole lens system;

$d_{i\text{-}j}$=spatial distance between the i-th and the j-th lens group.

16. An image forming lens system having at least three lens groups, wherein diameters of outer most circumferences of all of the lens groups are identical, and wherein positions of at least two lens groups of said at least three lens groups in an optical axis direction is determined by direct contact of the two lens groups, said lens system comprising:

a first lens group having a positive meniscus lens with a convex lens surface on the object side, a second lens group consisting of a double-concave lens, and a third lens group consisting of a double-convex lens, arranged in this order from the object side, said lens groups satisfying the following relationships:

$$0.8 < f_1/f \leq 1.0 \quad (1)$$

$$0.2 < -f_2/f < 0.4 \quad (2)$$

$$0.2 < f_3/f < 0.4 \quad (3)$$

$$0.6 < -r_{1\text{-}2}/r_{2\text{-}1} < 0.8 \quad (4)$$

$$0.5 < r_{2\text{-}2}/r_{3\text{-}1} < 0.7 \quad (5)$$

$$d_{1\text{-}2}/L < 0.15 \quad (6)$$

$$d_{2\text{-}3}/L < 0.1 \quad (7)$$

wherein, f=focal length of the whole lens system;

$f_i$=focal length of the i-th lens group;

$r_{i\text{-}1}$=radius of curvature of the lens surface of the i-th lens group on the object side;

$r_{i\text{-}2}$=radius of curvature of the lens surface of the i-th lens group on the image side;

L=length of the whole lens system;

$d_{i\text{-}j}$=spatial distance between the i-th and the j-th lens group.

17. An image forming lens system comprising:

a first lens group having a positive meniscus lens with a convex lens surface on the object side, a second lens group consisting of a double-concave lens, and a third lens group consisting of a double-convex lens, arranged in this order from the object side, wherein the lens groups satisfy the following relationships;

$$0.8 < f_1/f \leq 1.0 \quad (1)$$

$$0.2 < -f_2/f < 0.4 \quad (2)$$

$$0.2 < f_3/f < 0.4 \quad (3)$$

$$0.6 < -r_{1\text{-}2}/r_{2\text{-}1} < 0.8 \quad (4)$$

$$0.5 < r_{2\text{-}2}/r_{3\text{-}1} < 0.7 \quad (5)$$

$$d_{1\text{-}2}/L < 0.15 \quad (6)$$

$$d_{2\text{-}3}/L < 0.1 \quad (7)$$

wherein f=focal length of the whole lens system;

$f_i$=focal length of the i-th lens group;

$r_{i\text{-}1}$=radius of curvature of the lens surface of the i-th lens group from the object side;

$r_{i\text{-}2}$=radius of curvature of the lens surface of the i-th lens group from the image side;

L=length of the whole lens system;

$d_{i\text{-}j}$=spatial distance between the i-th lens group and the j-th lens group.

* * * * *